June 25, 1935. J. E. HUTCHMAN 2,006,168
ANNEALING METAL ARTICLES
Filed Sept. 11, 1934
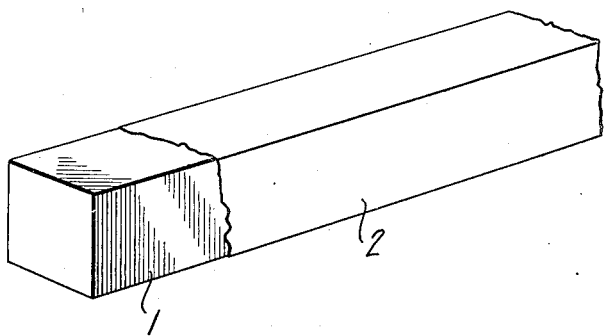
INVENTOR
JAMES E. HUTCHMAN
BY
ATTORNEY Patented June 25, 1935

2,006,168

UNITED STATES PATENT OFFICE 2,006,168

ANNEALING METAL ARTICLES

James Edwin Hutchman, Indianapolis, Ind., assignor, by mesne assignments, to United States Rubber Company, New York, N. Y., a corporation of New Jersey Application September 11, 1934, Serial No. 743,548

4 Claims. (Cl. 148—4)

This invention relates to annealing metal articles having finished surfaces without staining or otherwise defacing the finished surfaces so as to necessitate a re-finishing operation after completion of the annealing.

In numerous metal fabrications, articles are produced which have a finished surface which becomes defaced during the annealing of the metal subsequent to the fabricating operation and this necessitates a re-finishing operation to bring the surface back to that desirable condition which it had prior to the annealing. For example, the surface of an aluminum article which is formed by an extrusion process, is highly finished but on annealing, generally for a period of about 6 to 20 hours in steam at a temperature around 350° F., the surface becomes dulled and stained and if it is desired to present an attractive surface, it must be re-finished in a separate operation.

The present invention relates to a method of protecting the finished surfaces of metals during annealing operations and more particularly to the protection of finished aluminum surfaces.

The invention is more or less diagrammatically shown in the accompanying drawing which illustrates a metal article with a finished surface protected according to the present invention against deterioration during annealing operation.

By the present invention, the finished surface to be protected is provided with a removable coating comprising a rubber composition which will not become tacky and unduly adhere to the finished surface during the annealing operation, or harden and crack and prevent the coating from being readily stripped off when desired. The rubber is preferably applied to the surface in the form of an aqueous dispersion, such as latex, by a dipping, spreading or spraying operation followed by drying, with or without a previous chemical coagulation of the rubber. Since annealing operations take place at relatively high temperatures, the rubber should be well cured, and be compounded with an anti-oxidant. Preferably unvulcanized latices containing anti-oxidants, vulcanizing agents, and accelerators are used and the rubber deposit vulcanized during the annealing operation. If desired, of course, such a rubber compound may be vulcanized prior to the annealing operation, and if an ultra accelerator is used, such prior vulcanization may take place at room temperature. Also, if desired, a pre-vulcanized latex may be used. The rubber film should be sufficiently thick to be readily removed when desired after the annealing operation.

In the drawing, 1 represents an extruded aluminum article and 2 a rubber coating, partly broken away, on the finished surfaces of the aluminum article. As an illustration of a specific composition which may be effectively utilized in carrying out the present invention, but without intention to limit the invention to such composition, the following is included:

| | Parts by weight |
|---|---|
| Creamed latex (62% solids) | 167 |
| Zinc oxide | 1 |
| Sulphur | 2.5 |
| Accelerator | 1 |
| Anti-oxidant | .33 |

Rubber coatings from such a dispersion have been found satisfactory in ordinary annealing operations. Heat resisting materials such as ground sawdust, wood flour and the like may be included in the rubber composition either by adding the same to the latex itself, or, if the latex is applied by spraying operation, utilizing separate sprays of the powdered material simultaneously with the application of the latex, or subsequently to the application of the latex and just before complete drying of the same to provide an outer protective coat over the rubber composition. Such temporary protective coatings may be removed from the metal article immediately after annealing or, if desired, may remain on the article to protect the surface during subsequent operations utilizing the material or to protect the surface during handling, storage or the like.

The metal articles may be utilized in the interior of buildings and set in place during construction of the same in which case it is desirable to leave the rubber coating on the surface until completion of the building itself. If the metal articles are utilized in the exteriors of buildings, then a powdered metal such as aluminum may be included in the rubber coating as described in my co-pending application, Serial No. 743,547, filed September 11, 1934, and the powdered metal which has a high reflective power for heat and light will minimize the deteriorating action of sunlight on the rubber composition until completion of building operations at which time the protective coating may be removed.

The term "aqueous dispersion of rubber" as used in the description and claims is intended to designate broadly coagulable dispersions of elastic materials including artificial dispersions of rubber and rubber-like materials as well as natural latex.

With the above detailed disclosure of the invention, it is evident that numerous modifications will suggest themselves to those skilled in the art and it is not desired to limit the invention otherwise than as set forth in the appended claims.

Having thus described my invention, what I claim and desire to protect by Letters Patent is:

1. The method of annealing a metal article having a finished surface without staining or otherwise defacing said surface so as to necessitate a refinishing operation which comprises covering said surface with a removable coating comprising a rubber composition which will not become tacky and unduly adhere to the finished surface after the annealing operation or harden and crack and prevent the coating from being readily stripped off when desired, and subjecting the thus protected article to annealing conditions.

2. The method of annealing a metal article having a finished surface without staining or otherwise defacing said surface so as to necessitate a refinishing operation which comprises covering said surface with a removable coating comprising the direct deposit of solids of an aqueous dispersion of rubber, which deposit will not become tacky and unduly adhere to the finished surface after the annealing operation or harden and crack and prevent the coating from being readily stripped off when desired, and subjecting the thus protected article to annealing conditions.

3. The method of annealing a metal article having a finished surface without staining or otherwise defacing said surface so as to necessitate a refinishing operation which comprises covering said surface with a removable coating comprising a vulcanizable rubber composition which when vulcanized will not become tacky after the annealing operation and unduly adhere to the finished surface or harden and crack and prevent the coating from being readily stripped off when desired, and subjecting the thus coated article to the annealing operation to vulcanize the rubber composition and anneal the metal article.

4. The method of annealing a metal article having a finished surface without staining or otherwise defacing said surface so as to necessitate a refinishing operation which comprises covering said surface with a removable coating comprising the vulcanizable direct deposit of solids of an aqueous dispersion of rubber which when vulcanized will not become tacky after the annealing operation and unduly adhere to the finished surface or harden and crack and prevent the coating from being readily stripped off when desired, and subjecting the thus coated article to the annealing operation to vulcanize the rubber composition and anneal the metal article.

JAMES EDWIN HUTCHMAN.